United States Patent
Burns et al.

(10) Patent No.: US 6,792,424 B1
(45) Date of Patent: Sep. 14, 2004

(54) SYSTEM AND METHOD FOR MANAGING AUTHENTICATION AND COHERENCY IN A STORAGE AREA NETWORK

(75) Inventors: Randal Chilton Burns, Sunnyvale, CA (US); Darrell Long, Soquel, CA (US)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 09/298,663

(22) Filed: Apr. 23, 1999

(51) Int. Cl.[7] .............................................. G06F 17/30
(52) U.S. Cl. .................. 707/9; 707/10; 707/3; 707/1; 709/217; 709/220
(58) Field of Search ............... 707/10, 3, 4, 9, 707/1, 220, 217

(56) References Cited

U.S. PATENT DOCUMENTS

| | | | |
|---|---|---|---|
| 4,885,680 A | 12/1989 | Anthony et al. ............. 364/200 |
| 4,992,930 A | 2/1991 | Gilfeather et al. .......... 364/200 |
| 5,173,939 A | * 12/1992 | Abadi et al. ................... 380/25 |
| 5,235,642 A | * 8/1993 | Wobber et al. ............... 380/25 |
| 5,485,626 A | 1/1996 | Lawlor et al. ............... 395/650 |
| 5,497,421 A | * 3/1996 | Kaufman et al. ............. 380/23 |
| 5,526,512 A | 6/1996 | Arimilli et al. ............. 395/473 |
| 5,613,153 A | 3/1997 | Arimilli et al. ............. 395/821 |
| 5,692,174 A | 11/1997 | Bireley et al. .............. 395/603 |
| 5,692,182 A | 11/1997 | Desai et al. ................. 395/610 |
| 5,761,660 A | 6/1998 | Josten et al. .................... 707/8 |
| 5,765,146 A | 6/1998 | Wolf et al. ..................... 707/2 |
| 5,774,692 A | 6/1998 | Boyer et al. ................. 395/500 |
| 5,832,211 A | 11/1998 | Blakely, III et al. .... 395/188.01 |
| 5,838,903 A | 11/1998 | Blakely, III et al. .... 395/188.01 |
| 6,002,748 A | * 12/1999 | Leichner ....................... 379/48 |
| 6,044,155 A | * 3/2000 | Thomlinson et al. ......... 380/49 |
| 6,105,027 A | * 8/2000 | Schneider et al. ............. 707/9 |
| 6,226,744 B1 | * 5/2001 | Murphy et al. ............. 713/200 |
| 6,247,026 B1 | * 6/2001 | Waldo et al. ................ 707/206 |

FOREIGN PATENT DOCUMENTS

| | | | |
|---|---|---|---|
| JP | 10116271 A | * 5/1996 | ........... G06F/17/21 |
| WO | WO 96/11430 | 4/1996 | |

OTHER PUBLICATIONS

Publication: "Multi–Level DASD Array Storage System." IBM Technical Disclosure Bulletin. vol. 38, No. 6, pp. 23–24. Jun. 1995.
Publication: "Method to Manage the Mapping of Logical to Physical Record." IBM Technical Disclosure Bulletin. vol. 38, No. 12, pp. 261–262. Dec. 1995.
Publication: "Cache Port Fencing for Dual Cache Subsystem." IBM Technical Disclosure Bulletin. vol. 40, No. 3, pp. 125–126. Mar. 1997.

* cited by examiner

Primary Examiner—Jean M. Corrielus
(74) Attorney, Agent, or Firm—John L. Rogitz

(57) ABSTRACT

A data management system for storage area networks (SANs) includes an authentication and directory service that integrates the management of cache coherency and synchronization into an authentication mechanism, referred to herein as a ticket. The data in the system is notionally classified into colors. When a principal computer requests a read or a write access to data of a particular "color", the service determines whether the principal is authorized for the requested access, and if so, the service issues a ticket to the principal that specifies a data color that the bearer of the ticket is authorized to access using the type of access mechanism specified on the ticket. A hidden "hue" can also be specified on the ticket. The service can variously inform principals to cancel tickets based on color or time of issue and can also variously inform storage devices not to honor tickets of a certain hue or time of issue as appropriate to thereby maintain cache coherency and data consistency.

42 Claims, 4 Drawing Sheets

GENERAL PROCESS FLOW

GENERAL PROCESS FLOW

| PRINCIPAL ID | PASSWORD/PUBLIC KEY | VALID COMBINATIONS OF ACCESS MODES & COLORS |
|---|---|---|
| 001 | 1101 | BLUE, READ ONLY; WHITE, READ/WRITE; · · · |
| 002 | 1001 | GREEN, READ/WRITE; RED, READ ONLY; · · · |
| ⋮ | ⋮ | ⋮ |

*FIG 3 - PERMISSIONS/CAPABILITY DATABASE*

| PRINCIPAL ID | TICKET COLOR | ACCESS MODE | HUE |
|---|---|---|---|
| 001 | BROWN | WRITE | LIGHT |
| 002 | GREEN | READ | DARK |
| ⋮ | ⋮ | ⋮ | ⋮ |

*FIG 4 - TICKET DIRECTORY*

| COLOR | PRINCIPALS HOLDING ACTIVE TICKETS | CACHE MANAGEMENT POLICY |
|---|---|---|
| BROWN | 001, 005 | READ/WRITE-ONE PRINCIPAL ONLY-OWNER |
| BLUE | 003 | READ ONLY-MULTIPLE PRINCIPALS |
| ⋮ | ⋮ | ⋮ |

*FIG 5 - CACHE MANAGEMENT DATABASE*

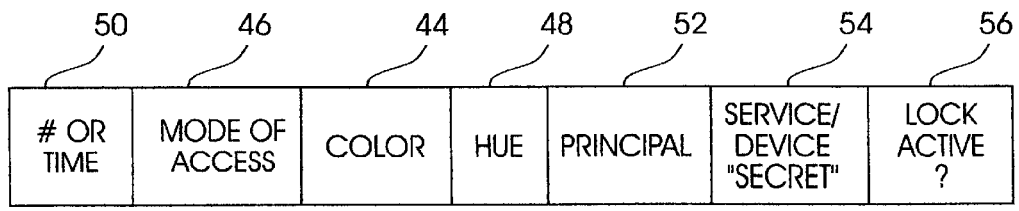

*FIG 6 - TICKET*

INFORMING PRINCIPALS
OF NEW REQUEST

REJECTING REQUEST

REVOKING TICKETS TO GRANT REQUEST

SYSTEM AND METHOD FOR MANAGING AUTHENTICATION AND COHERENCY IN A STORAGE AREA NETWORK

BACKGROUND OF THE INVENTION

1. Field of the Invention

The present invention relates generally to computer data storage systems, and more particularly to data networks having plural network-attached storage devices for distributed storage of data.

2. Description of the Related Art

Storage area networks (SANs) permit multiple computers, referred to herein as "principals", to access data that is stored across multiple storage devices (such as disks, tapes, or DVDs). In such a distributed system, because each principal can directly access each storage device as required, no central server is required. Consequently, no bottlenecks exist through which all data must be sent or received. Accordingly, a comparatively high rate of data can be sent and received in SANs. Moreover, SANs are robust in the sense that they can operate acceptably should one or a few machines fail, whereas a storage system that depends on a central server cannot operate if the server fails.

SANs do, however, introduce considerations that are either absent in central server systems or are less complicated (hence more easily resolved) in central server systems. These considerations include authenticating that a principal requesting a data access (e.g., a read or write) is authorized to perform the access. Relatedly, in SANs it is difficult to fence off principals from data for which they have been previously authenticated but for which they are no longer authenticated. Also, in SANs the consideration of serialized access to objects becomes an issue, because the storage devices in SANs are aware only of data blocks, not data objects, and it consequently is difficult for the storage device to protect against race conditions and data inconsistency when multiple computers access the same object. Further, without a central server managing storage access, it is difficult to guarantee distributed cache coherency, i.e., it is difficult to guarantee that local copies of data retained by principals to be written into their respective caches are identical with each other.

Despite the fact that storage devices are associated with their own onboard processors, these processors tend to have limited processing power. The present invention recognizes that as a consequence, conventional solutions to the above issues, such as, for example, using distributed shared memory for cache coherency or running a distributed authentication service at each storage node, are less than optimum and indeed are often not viable. Further, implementing conventional solutions requires the sharing of large amounts of data between storage devices, consequently limiting the scalability of SANs to comparatively small data storage systems. Accordingly, the present invention recognizes a need for implementing a SAN while maintaining data consistency and cache coherency in the SAN and while providing for the authentication of principals, without requiring that the storage devices know the identity of the requester or be aware of data objects, files, or metadata.

SUMMARY OF THE INVENTION

The invention is one or more general purpose computers programmed according to the inventive steps herein to manage data access in a data network, such as (but not limited to) a storage area network (SAN). The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

The invention can be implemented by a computer system including plural general purpose computers, each of which establishes a "principal" as used herein. The system further includes a data storage system that in turn includes plural storage devices, such as hard disks. At least one storage area network interconnects the principals and the storage devices, and at least one computer-implemented service communicates with the storage area network for receiving data access requests from the principals and for selectively issuing data class and access authorizations thereto in response to the requests. In accordance with the present invention, the data class and access authorizations are presentable by the principals to one or more of the storage devices to allow a presenting principal to access data classes on the storage devices, with the service managing data access among the storage devices by means of the data class and access authorizations. Notionally, the data class and access authorizations are referred to herein as "tickets", and the data classes are notionally regarded herein as "colors". A ticket can be used by a principal only to access the indicated color. Preferably, each ticket includes a cryptographic strong hash or one-way function of a principal's password. Also, each color is represented by a large integer.

As set forth in detail below, the service includes computer readable code means for determining, prior to issuing a ticket in response to a request from a principal, whether granting a data access request will violate coherence of data in the data storage system. Also, computer readable code means in at least some principals define the distribution of data in the data storage system. Furthermore, computer readable code means are associated with the service for establishing a salt (a random number that is concatenated with a message, key, or other string) for at least some colors, the salts being included in at least some tickets, with each salt being established by a random string.

In the preferred embodiment, the service includes computer readable code means for managing data access among the storage devices by informing one or more principals of a potentially interfering request. The principals include computer readable code means for invalidating local caches or discarding tickets and requesting new tickets in response thereto. Also, the service includes computer readable code means for managing data access among the storage devices by rejecting a potentially interfering request or by queuing the potentially interfering request until it no longer potentially interferes with a prior request. Still further, the service includes computer readable code means for managing data access among the storage devices by revoking one or more tickets issued prior to a predetermined ticket. And, the service can include computer readable code means for instructing the storage devices to ignore tickets identifying one or more predetermined salts, or for instructing the storage devices to ignore tickets identifying one or more predetermined colors. The service also preferably includes computer readable code means for refreshing selected principals after at least some ticket revocations by issuing new tickets to the selected principals.

In another aspect, for a distributed data storage system having plural data storage devices and plural principals accessing the devices, a computer-implemented method is disclosed for managing data access in the data storage system. The method includes notionally associating data elements in the data storage system with colors, and receiving requests for data access from the principals. Also, the method includes selectively issuing tickets in response to the requests, with each ticket authorizing at least one type of data access with respect to at least one color. As intended by the present invention, the tickets are generated or not in response to requests to manage data access among the storage devices on the basis of the colors.

In still another aspect, a computer program device includes a computer program storage device that is readable by a digital processing apparatus, and a program is on the program storage device. The program includes instructions that can be executed by the digital processing apparatus for performing method acts for managing data access in a data storage system having plural data storage devices accessible by plural principals. These acts include grouping data into plural colors and receiving requests from principals for access to the data. The acts also include responding to the requests while maintaining data coherency by selectively issuing and revoking tickets to principals. Each ticket represents at least one data access authorization to at least one color of data.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a schematic representation of a permissions/capability database used by the present logic;

FIG. 4 is a schematic representation of a ticket directory used by the present logic;

FIG. 5 is a schematic representation of a cache management database used by the present logic;

FIG. 6 is a schematic representation of a ticket of the present invention;

DETAILED DESCRIPTION OF THE PREFERRED EMBODIMENTS

Figure 1:
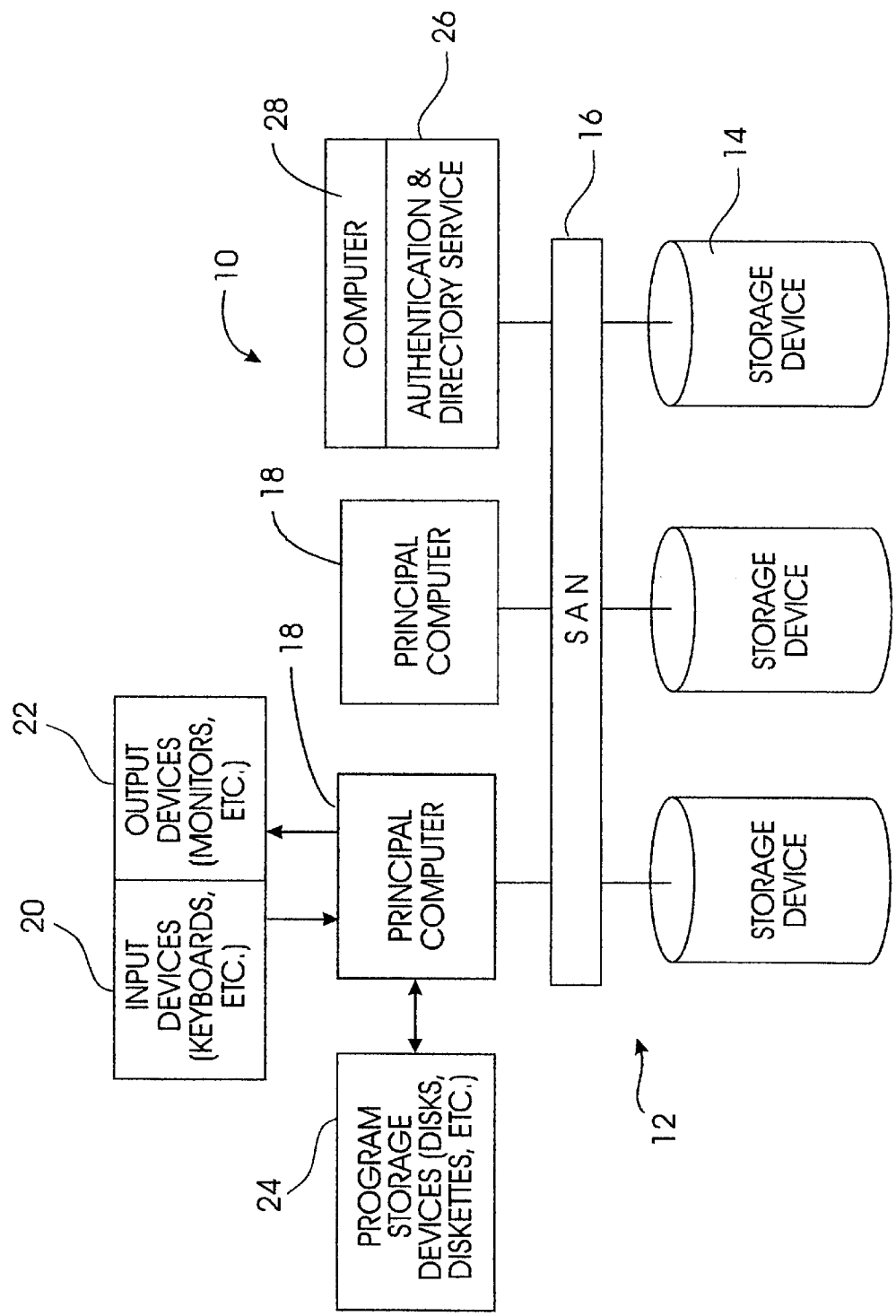
FIG. 1 is a schematic diagram showing a preferred architecture of the system of the present invention.

Referring initially to FIG. 1, a system is shown, generally designated 10, for managing security, coherency, and impliedly, sequential consistency, in a directly accessible network storage system, generally designated 12. In the preferred embodiment the network storage system 12 is referred to as a storage area network, or SAN. As shown, the SAN 12 includes plural storage devices 14 that can be accessed via a network 16 by plural computer-implemented principals 18. A "principal" 18 can be a file system principal or it can be a file server, database manager, multimedia system, or digital library manager.

With the above wide variety of principals in mind, and owing to the "color" classification protocol of the present invention in which data is managed by blocks, the communication protocol of the network 16 is block oriented. Accordingly, data management in the present system is independent of the object abstraction, and hence the present invention provides authentication and manageability of data objects without explicit knowledge of the particular types of objects being managed. This grouping by blocks abstraction, detailed further below, advantageously allows a SAN or other data network to manage data without embedding object or file level semantics in the storage system. Also, the system 10 permits a single storage environment to support multiple object abstractions with associated multiple cache management policies. Because each "color" described below is globally unique and represents a single data class even when the same color appears on different storage devices, implementation of non-linear formats such as log-structured data, striped data, and RAID is facilitated. In any case, it is to be appreciated that the system 10 can be generally applied to heterogenous computer hardware and software systems, permitting many storage applications to share a data network at a fine granularity, with each application implementing its own data management policy by means of the "color" system herein.

As envisioned by the present invention, the network 16 can be physically implemented by a storage systems architecture (SSA) network, or a gigabyte ethernet, or by an asynchronous transfer mode (ATM), or by a fiber channel network, or other high speed network. Or, the network 12 can be implemented by standard coaxial cabling or a wireless radiofrequency or infrared network. The storage devices 14, on the other hand, can be physically implemented by hard disks, magnetic drums, floppy diskettes, magnetic tape drives, DVDs or other optical storage media, DASD arrays, solid state storage devices, or other appropriate data storage devices. The principals 18 are digital processing apparatus, such as personal computers made by International Business Machines Corporation (IBM) of Armonk, N.Y., or any computer, including computers sold under trademarks such as AS400, with accompanying IBM Network Stations. As further exemplary but non-limiting examples, the principals 18 may be Unix computers, or OS/2 servers, or Windows NT servers, or IBM workstations, or IBM laptop computers, or mainframe computers.

FIG. 1 indicates, using an exemplary principal 18, that each computer in the present system 10 can be electrically connected to one or more respective input devices 20, e.g., mice or keyboards, which can be manipulated by a user of the system 10 to, e.g., generate requests for data. This data or products of operations on the data can be output via a respective output device 22, such as, e.g., a printer or monitor that are conventionally coupled to the computer. Other input devices, such as trackballs, joysticks, and voice recognition devices, as well as other computers, can be used. Likewise, other output devices, such as large screen displays and other computers, can be used.

The flow charts herein illustrate the structure of the logic of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the present logic may be a computer program that is executed by a processor within the appropriate as a series of computer-executable instructions on a program storage device 24. For example, the may reside in RAM of the appropriate computer, or the instructions may be stored on a DASD array, magnetic tape, electronic read-only memory, or other appropriate data storage device. In an illustrative embodiment of the invention, the computer-executable instructions may be lines of compiled C++ compatible code. It is to be understood that while for clarity of disclosure only one of the computers of the present invention is depicted with input devices 20, output devices 22, and program storage devices 24, all of the present computers can include such devices.

In addition to the principals 18, one or more authentication and directory services (referred to herein as "service") 26 can be implemented in software and executed by a service computer 28. The service computer 28 communicates with principals 18 via the network 16 as shown or via a separate general purpose network such as an ethernet or wide area network to enable the service 26 to undertake the logic disclosed herein for integrating the management of cache coherency and synchronization into an authentication mechanism. Specifically, the service computer 28 provides authentication and cache management to the system 10 through the mechanism referred to herein as "tickets". The service computer 28 is not, however, a storage manager; it does not allocate or move data blocks, and it does not actively control the storage devices 14. Instead, it simply authenticates principals 18 to access storage devices 14 and provides object location mappings (logical to physical) to the principals 18. If desired, the service computer 28 can also manage metadata for the SAN. It is the principals 18 that allocate and move data blocks.

Thus, the present system is distributed, in that the service 26 encodes, in the tickets, the information required for authentication, with the storage devices 14 enforcing the encoding. In other words, the task of an authentication server, namely, managing and enforcing data access policies, is advantageously divided and distributed among the authentication service(s) 26 and storage devices 14 in the present system 10, thereby facilitating consistent and cache-coherent access to data on an authenticated basis.

As intimated above, multiple services 26 establishing multiple security domains can be established if desired for scalability and other considerations. Each service 26 is informed of the "secrets" of the storage devices 14. One of the services 26 is a master service that manages a global map to determine which services manage which blocks on the data network 16, with the remaining services registering with the master service to ensure that plural services do not grant privileges to the same group of blocks. Or, multiple services can authenticate the same group of principals and colors as each other, if dynamic information regarding tickets, as well as static "secret" information, is shared between the services. In any case, if any one service's secrets are compromised, the data controlled by the other services remains secure.

Figure 2:
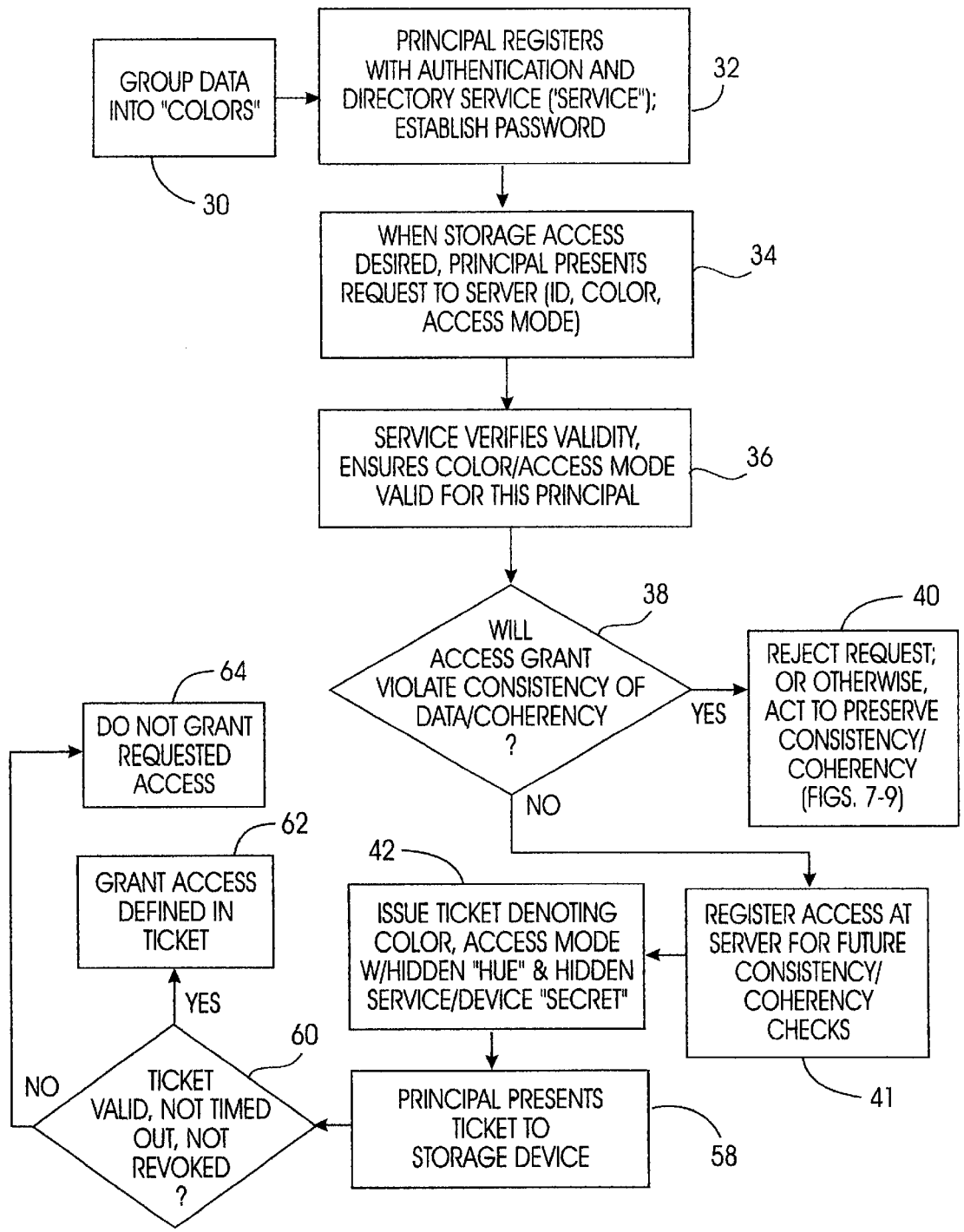
FIG. 2 is a flow chart showing the overall steps of the present logic in managing data access in a distributed storage network.

Now referring to FIG. 2, the overall logic steps of the present invention can be seen. Beginning at block 30, the data in the system 10 is classified into colors. This classification can be undertaken by one of the principals 18 that serves as an administrator. The administrator is designated when the service 26 is installed, and the administrator creates an access control list as set forth further below specifying which principals have which kind of access to which color, and whether any principals can recolor blocks of data on their own, and so on.

As intended by the present invention, a color represents a management and security data class. Any number of blocks can be colored the same color and each color is unique to the SAN; the same color on different storage devices denotes the same management/security class. In a preferred embodiment, the colors are implemented with large integers. While colors are a useful notional allegory for data classifications, other notional allegories can be used, such as sounds, shapes, etc.

As an example, to implement file level security a distributed file system could define all blocks of a file to have the same color, and one that is different from the colors of all other files. Any principal with the authorization to access any block of the file could access all blocks of the file, regardless of whether the data is contiguous or striped. It is to be understood, however, that the present invention is not limited to file systems. For example, a database could implement per table security classes by color, and then "color" any query results from that table the same color as the table.

Moving to block 32, the principals 18 register with the service 26 using, e.g., public key cryptography or a login authenticator such as the system referred to as "Kerberos" described in *Proceedings of the* 1988 *Winter Usenix Conf.*, pages 191–202 (1988). All the present system uses such an authenticator for is obtaining a first shared secret, and accordingly once the first shared secret is obtained, the present system no longer requires the login authenticator. During registration, a password is established for each principal 18. The password can be the principal's public key or private key. Also, during registration each principal 18 is associated with its authorized colors and access types as defined by, e.g., the administrator principal discussed above. FIG. 3 shows that after registration, a permissions/capability database is available to the service 26 for undertaking the steps below. In the exemplary embodiment shown, the permissions/capability database lists each principal 18 by ID, password/public key, and its authorized (valid) combinations of access modes and colors. Essentially, the permissions/capability database establishes an access control list.

After the principals 18 have registered, they can request access to various data in the system at block 34 by presenting a request to the service 26 for a particular type of access (read, write, change color, create color, seek, mount/unmount (for tape drives), release color, reserve a color) to a particular color. Of generalized importance to the present invention are "read" and "write" accesses.

Preceding each actual color/access request, however, a security protocol is followed to provide for mutual authentication between a requesting principal and the service 26. The goal is to ensure the correctness of the actions in the system 10 while minimizing computational overhead at the storage device that is governed by the ensuing tickets. In one preferred embodiment, the mutual authentication protocol includes a requesting principal 18 first sending its nonce to the service 26. Upon receipt of a principal's nonce, the service 26 then appends to the principal's nonce a nonce that the service 26 generates along with a hashed message authentication code (MAC or HMAC), which includes the requesting principal's password (or a one-way function performed on the principal's password, rather than the clear text of the password). Krawczk et al. in "HMAC: Keyed-hashing for Message Authentication", RFC 2104, 1997 disclose one or more such codes. The service 26 sends this data back to the requesting principal, which calculates the MAC and compares it to the transmitted MAC to verify the authenticity of the service 26. It is to be appreciated that the MAC of the requesting principal's password and the service nonce essentially establish a shared secret or key between the requesting principal 18 and the service 26 that can be used for encryption of subsequent messages between the two for that particular session.

As discussed above, once the principal-service mutual authentication is complete, the principal requests access to a particular color of data. As part of the actual ticket request, the principal appends its identification and the nonce of the service 26 to guarantee freshness. If desired, the actual ticket request can be encrypted as described above.

In response, the service 26 logic flows to block 36 to verify the validity of the request in light of the permissions/capability database shown in FIG. 3. In other words, the service 26 ensures that the requested color and access mode is valid for the requesting principal.

Additionally, the service 26 logic determines, at decision diamond 38, whether the requested access, if granted, will result in the violation of data coherency, as more fully set forth below. If it would result in a violation, the logic moves to block 40 to take one or more of the below-described actions, including rejecting the request or otherwise acting to preserve data coherency. By "coherence" is meant cache coherence, i.e., that the local caches of all principals 18 present the same image of the data as each other and as the system copy. In other words, if coherence is achieved, a read to location "X" always returns the value most recently written to "X". Thus, if cache coherency is achieved, sequential consistency of the data is implied. By "consistency" is meant that the data is correct with respect to actions of principals.

If, on the other hand, it is determined at decision diamond 38 that the requested access would not violate data coherency, the logic proceeds to block 41 to register the requested access with the server, for future consistency/coherency determinations at decision diamond 40. From block 41 the logic moves to block 42 to issue a ticket, which is an authorization to execute the access denoted on the ticket for the particular data class as represented by a color, the color also being denoted on the ticket. Additionally, the ticket bears a hidden salt, referred to herein as a "hue", for purposes to be shortly disclosed. A salt is a random number concatenated with a message, key, or other string to render the system more secure or more functional. When issued, tickets are listed by the service 26 in a ticket directory, an example of which is shown in FIG. 4. In one exemplary embodiment, the ticket directory lists the tickets issued to the principals 18 by principal identification (the first column in FIG. 4), ticket color (second column), access mode (third column), and hue (fourth column). Also, the time of issuance for each ticket can be listed in the ticket directory, if desired.

Moreover, a cache management database as shown in FIG. 5 can be generated by combining information contained in the permissions/capability database shown in FIG. 3 with the ticket directory shown in FIG. 4. In a specific embodiment, the cache management database lists, by color and principals holding that color, the cache management policy for that color. In the example shown in FIG. 5, for the color brown, two principals, nos. 001 and 005, hold active tickets, and the policy associated with the color brown is to permit only one at a time of the two principals 001, 005 to have either read access or write access to the color brown, as requested. In contrast, for the color blue, only one principal—no. 003—holds a ticket, with the management policy for that color being read only by as many principals who request a read, simultaneously if so requested. It will readily be appreciated that the present logic accesses one or more of the databases shown in FIGS. 3–5 in undertaking the decision at decision diamond 38 and the actions at blocks 40 and 42.

Before proceeding further with the description of the overall process flow shown in FIG. 2, brief reference is made to FIG. 6, which shows a schematic sample of a ticket in accordance with the present invention. As can be appreciated in reference to FIG. 6, each ticket is a large integer string that indicates, as mentioned above, a color 44, mode of access 46, and hue 48. Additionally, each ticket bears a time stamp or number 50 as shown, indicating the time of issuance (or order of issuance) of the ticket. Preferably, the ticket numbers output by the service 26 are sequential and increasing and act as a global so-called "lamport clock" as disclosed by Lamport in "Time, Clocks, and the Ordering of Events in a Distributed System", *Communications of the ACM*, 21(7), 1978. It will readily be appreciated that each storage device 14 can retain the maximum ticket number it has received as an indication of the minimum value of the lamport clock at the service 26. Furthermore, if desired each ticket can list the principal to which it was issued.

Also, each ticket can list a service "secret" 54 in the form of a long random number. This secret is contained in each ticket in an encrypted form that can be verified by a storage device when a principal presents the device with a ticket, but the secret is not visible to the principal (or to attackers). This secret is used by a storage device 14 that is presented with a ticket to verify the validity and authenticity of the ticket.

Further, a lock field 56 indicating whether a lock is active or not can be included in the ticket, as shown in FIG. 6. The locking mechanism of the present invention permits applications to share data at the block level by allowing the principal 18 bearing the ticket the right to lock accessed items or all items in a color in various ways, e.g., a lock permitting read only, a lock permitting write only, and so on. With this field, complex locking policies can be encoded and enforced at the disk level for serialized access to data and for promoting data consistency. Locking protocols, if any, are maintained on a per-color basis. The present per-color locking protocol at the storage device permits distributed applications to move synchronization tasks from application level communication to the storage devices 14 (e.g., to disk drives) to reduce the time necessary to develop new applications, and to permit applications to share data for writing and metadata updates without repeatedly requesting tickets from the service 26.

In addition to the above fields, the granted ticket can contain a repetition of the request from the principal 18, with the ticket being "MACed" (i.e., having a MAC function performed on it) along with the shared secret shown in FIG. 6 between the service 26 and storage device 14, and a shared secret derived by the service 26 for the principal 18 and storage device 14 to subsequently share. The ticket is then encrypted with the service 26-principal 18 shared key.

Returning to the overall flow shown in FIG. 2, when a principal 18 holding a ticket wishes to undertake the access specified on a ticket for the data color specified on the ticket, the principal 18 presents the ticket to a storage device 14 at block 58. In a preferred implementation, in presenting a ticket to a storage device 14, the principal 18 sends the ticket request, the principal nonce, and ticket identifier and then signs the combined message with the service 26-principal 18 shared key as derived by the service 26. This ensures freshness of the message, and by adding the ticket request and ticket identifier, the freshness is guaranteed to be associated with the particular request being presented. This prevents an attacker from copying the hash of a new principal nonce and appending it to a previous request on the same ticket to successfully gain unauthorized access. Accordingly, the principal-storage device key is derived from the ticket request message and the server-device secret already possessed by the storage device; consequently, no trusted third party key distribution protocol is required.

At decision diamond 60, the storage device 14 receiving the ticket determines whether the ticket is valid, not timed out, and not revoked by comparing the ticket time field 50, color field 44, and hue field 48 with any revocation messages received from the service 26 as set forth further below. If the ticket is valid, the requested access is granted at block 62; otherwise, it is denied at block 64.

Figure 7:
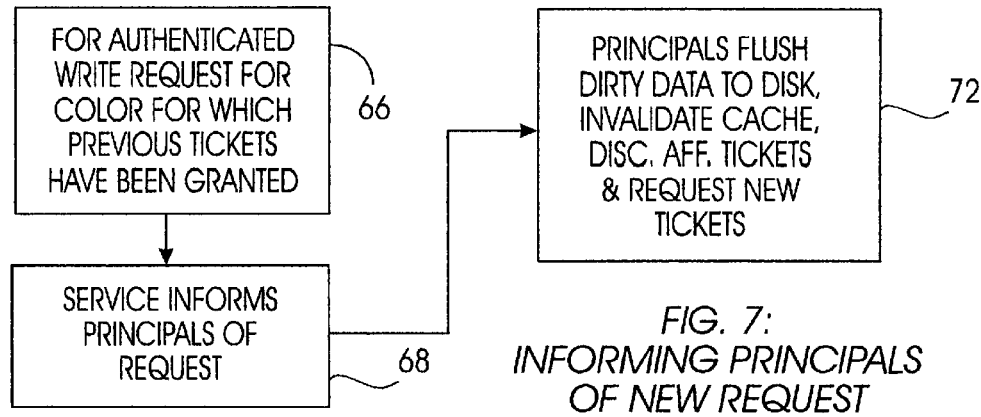
FIG. 7 is a flow chart showing the logic followed in one aspect of the data access management function.
Figure 8:
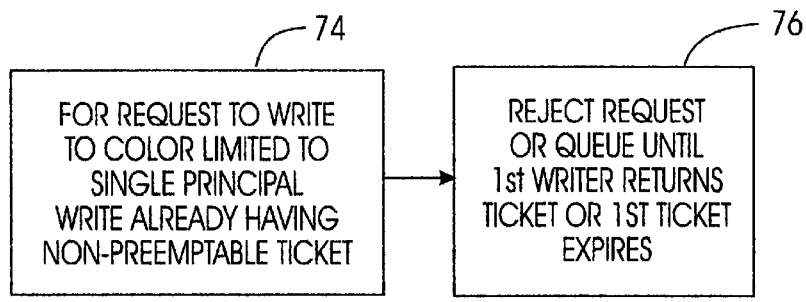
FIG. 8 is a flow chart showing the logic followed in another aspect of the data access management function.
Figure 9:
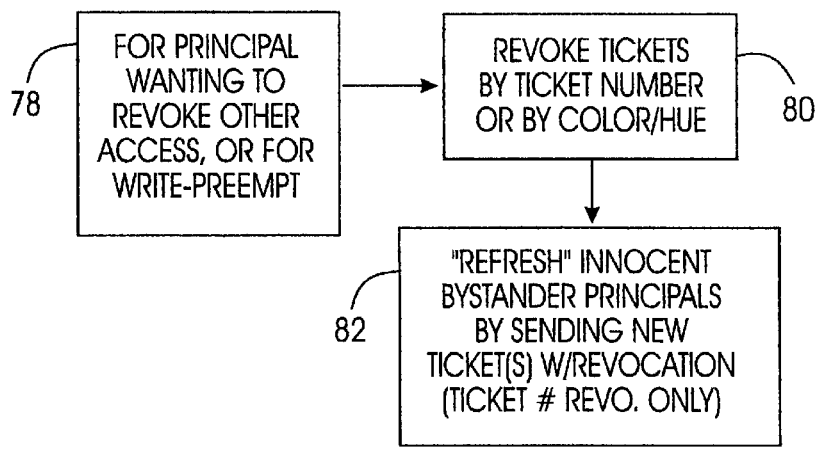
FIG. 9 is a flow chart showing the logic followed in yet another aspect of the data access management function.

Now referring to FIGS. 7–9, various logic is shown for managing data access in the system 10 in the presence of potentially conflicting ticket requests. Beginning at block 66 in FIG. 7, when an authenticated write request for a color for which one or more previous tickets to other principals have been previously granted and remain outstanding, the logic moves to block 68, wherein the service 26 informs the other (previously authorized) principals of the request. The previously authorized principals then proceed to block 72 to flush "dirty" cache data, if any, to disk, invalidate their respective caches, discard the affected tickets they hold for the relevant color, and request new tickets.

FIG. 8, block 74 contemplates that a request to write to a color might be received, wherein the color is limited to a single principal write access and a write access has already been granted to a preexisting, non-preemptible ticket. In such a case, the service 26 logic moves to block 76 to reject the new write request or to queue the request until the first writer returns its ticket or until the ticket of the first writer expires.

In contrast to the situations addressed by the logic in FIGS. 7 and 8, the logic of FIG. 9 contemplates receiving, from a principal listed in the cache management database of FIG. 5 as an "owner" of a color (or other principal with write access), a request to revoke other tickets for that color or a request from the "owner" to preemptively write to that color. Under these circumstances, the logic proceeds from block 78 to block 80 to revoke tickets either by ticket number or by hue/color.

To revoke tickets by ticket number, the service 26 sends a message to the storage devices 14 to adjust the minimum value of the lamport clock of the system, as mentioned previously in reference to the ticket description of FIG. 6. Essentially, the message instructs the devices 14 to ignore tickets having numbers (lamport clocks) less than a predetermined number. When revoking tickets by ticket number, "innocent bystander" principals might have tickets that otherwise should be valid revoked. Under these circumstances, the logic can move to block 82 to refresh such principals by sending new tickets with the revocation messages to innocent bystanders.

As mentioned above, tickets can also be revoked at block 80 by color/hue. For per color revocation, the service 26 instructs the storage devices 14 to change the hues of the revoked color blocks by changing the salt of the blocks for that color. While existing tickets for that color can have ticket numbers above the minimum, they specify a hue that no longer exists (and, thus, cannot be used for access). Principals, however, can re-authenticate because they know the base color and the service 26 will grant new tickets with updated hue.

Because each ticket can have its own "hue", revoking tickets by hue does not result in innocent bystander principals. However, hue-based revocation requires storage devices to recolor blocks; consequently, with storage devices having limited capability, time-based revocation might be required.

In the case of an unresponsive computer (which might be acting on behalf of several principals) in the system 10, the service 26 can simply advance the minimum lamport clock past the highest valued ticket held by the unresponsive computer (and, thus invalidate a set of tickets) to "fence off" the computer, with innocent bystander computers being refreshed as disclosed above. This avoids data consistency violations were the unresponsive computer to come back on line and attempt to access data using expired tickets.

While the particular SYSTEM AND METHOD FOR MANAGING AUTHENTICATION AND COHERENCY IN A STORAGE AREA NETWORK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one" unless otherwise recited.

We claim:

1. A computer system, comprising:
   plural general purpose computers establishing plural principals;
   a data storage system including plural storage devices;
   at least one data network interconnecting the principals and the storage devices; and
   at least one computer-implemented service communicating with the data network for receiving data access requests from the principals and for selectively issuing data class and access authorizations thereto in response to the requests, the data class and access authorizations being presentable by the principals to one or more of the storage devices to allow a presenting principal to access data classes on the storage devices, the service managing data access among the storage devices by means of the data class and access authorizations.

2. The system of claim 1, wherein the service includes computer readable code means for determining, prior to issuing a data class and access authorization in response to a request from a principal, whether granting a data access request will violate consistency and/or cache coherence of data in the data storage system.

3. The system of claim 2, wherein each data class and access authorization represents at least one indicated class of data to be accessed and at least one type of access, and the authorization can be used by a principal only to access the indicated class of data using the type of access.

4. The system of claim 3, wherein the data is grouped into the classes based on an administrator principal.

5. The system of claim 1, further comprising computer readable code means in at least some principals for defining the distribution of data in the data storage system.

6. The system of claim 1, wherein each data class and access authorization includes a cryptographic strong hash or one-way function of a principal's password.

7. The system of claim 1, wherein each data class is represented by a large integer.

8. The system of claim 1, further comprising computer readable code means associated with the service for establishing a salt for at least some data classes, the salts being included in at least some data class and access authorizations.

9. The system of claim 8, wherein the service includes computer readable code means for managing data access among the storage devices by informing one or more principals of a potentially interfering request, and the principals include computer readable code means for invalidating local caches or discarding data class and access authorizations and requesting new data class and access authorizations in response thereto.

10. The system of claim 8, wherein the service includes computer readable code means for managing data access among the storage devices by rejecting a potentially interfering request or by queuing the potentially interfering request until it no longer potentially interferes with a prior request.

11. The system of claim 8, wherein the service includes computer readable code means for managing data access among the storage devices by revoking one or more data class and access authorizations issued prior to a predetermined data class and access authorization, the service further including computer readable code means for instructing the storage devices to ignore data class and access authorizations identifying one or more predetermined salts, or for instructing the storage devices to ignore data class and access authorizations identifying one or more predetermined data classes, or for instructing the storage devices to ignore data class and access authorizations bearing one or more predetermined timestamps.

12. The system of claim 11, wherein the service includes computer readable code means for refreshing selected principals after at least some data class and access authorization revocations by issuing new data class and access authorizations to the selected principals.

13. For a distributed data storage system having plural data storage devices and plural principals accessing the devices, a computer-implemented method for managing data access in the data storage system, the method comprising the acts of:
notionally associating data elements in the data storage system with colors;
receiving requests for data access from the principals; and
selectively issuing tickets in response to the requests, each ticket authorizing at least one type of data access with respect to at least one color, the tickets being generated or not in response to requests to manage data access among the storage devices on the basis of the colors.

14. The method of claim 13, wherein each ticket represents at least one color and at least one type of access, and the authorization can be used only to access the indicated color using the type of access.

15. The method of claim 14, wherein the data is grouped into the colors by one or more administering principals.

16. The method of claim 14, wherein the distribution of data in the data storage system is defined by the principals.

17. The method of claim 14, wherein each ticket includes a cryptographic strong hash or one-way function of a principal's password.

18. The method of claim 14, wherein each color is represented by a large integer.

19. The method of claim 14, wherein each ticket includes a salt establishing a hue.

20. The method of claim 14, wherein data is managed among the storage devices by informing one or more principals of a potentially interfering request, and the principals invalidate local caches or discard tickets and request new tickets in response thereto.

21. The method of claim 14, wherein data is managed among the storage devices by rejecting a potentially interfering request or by queuing the potentially interfering request until it no longer potentially interferes with a prior request.

22. The method of claim 14, wherein data is managed among the storage devices by revoking one or more tickets issued prior to a predetermined time, tickets being revoked by instructing the storage devices to ignore tickets identifying one or more predetermined hues, or by instructing the storage devices to ignore tickets identifying one or more predetermined colors, or by instructing the storage devices to ignore tickets bearing one or more predetermined timestamps.

23. The method of claim 14, wherein selected principals are refreshed after at least some ticket revocations by issuing new tickets to the selected principals.

24. A computer program device comprising:
a computer program storage device readable by a digital processing apparatus; and
a program on the program storage device and including instructions executable by the digital processing apparatus for performing method acts for managing data access in a data storage system having plural data storage devices accessible by plural principals, the acts executed by the instructions comprising:
grouping data into plural colors;
receiving requests from principals for access to the data;
responding to the requests while maintaining data coherency by selectively issuing and revoking tickets to principals, each ticket representing at least one data access authorization to at least one color of data.

25. The device of claim 24, wherein each ticket represents at least one color and at least one type of access, and the authorization can be used only to access the indicated color using the type of access.

26. The device of claim 25, wherein the data is grouped into the colors by at least one administering principal.

27. The device of claim 24, wherein the distribution of data in the data storage system is defined by the principals.

28. The device of claim 24, wherein each ticket includes a cryptographic strong hash or one-way function of a principal's password.

29. The device of claim 24, wherein each color is represented by a large integer.

30. The device of claim 24, wherein at least some tickets include respective strings establishing respective hues.

31. The device of claim 24, wherein the acts executed by the instructions include informing one or more principals of a potentially interfering request, the principals invalidating local caches or discarding tickets and requesting new tickets in response thereto.

32. The device of claim 24, wherein the acts executed by the instructions include rejecting a potentially interfering request or by queuing the potentially interfering request until it no longer potentially interferes with a prior request.

33. The device of claim 24, wherein the acts executed by the instructions include revoking one or more tickets issued prior to a predetermined time, tickets being revoked by instructing the storage devices to ignore tickets identifying one or more predetermined hues, or by instructing the storage devices to ignore tickets identifying one or more predetermined colors, or by instructing the storage devices to ignore tickets bearing one or more predetermined timestamps.

34. The device of claim 24, wherein the acts executed by the instructions include refreshing selected principals after at least some ticket revocations by issuing new tickets to the selected principals.

35. The system of claim 1, comprising plural services.

36. The system of claim 1, wherein the data class and access authorizations include at least one locking protocol for enforcement thereof at a disk level for serialized access to data.

37. The method of claim 13, wherein the tickets include at least one locking protocol for enforcement thereof at a disk level for serialized access to data.

38. The device of claim 24, wherein the tickets include at least one locking protocol for enforcement thereof at a disk level for serialized access to data.

39. The system of claim 1, wherein the system undertakes an authentication and management function, and the authentication and management function is distributed among the service and the storage devices.

40. The system of claim 1, wherein the principals include storage applications each having a respective data management policy implemented by the system.

41. The device of claim 24, wherein the method acts include undertaking an authentication and management function, and the authentication and management function is distributed among at least one authentication service and the storage devices.

42. The device of claim 24, wherein the principals include storage applications each having a respective data management policy implemented by the method acts.

* * * * *